(12) United States Patent
Huhn et al.

(10) Patent No.: US 6,194,087 B1
(45) Date of Patent: Feb. 27, 2001

(54) COMPOSITE MULTILAYER BEARING MATERIAL

(75) Inventors: Hans-Ulrich Huhn, Schlangenbad-Wambach; Dietmar Wiebach, Wiesbaden; Karl-Heinz Gruenthaler, Usingen; Peter Spahn, Mühltal, all of (DE)

(73) Assignee: Clyco-Metall-Werke Glyco B.V. & Co. KG, Wiesbaden (DE)

( * ) Notice: Subject to any disclaimer, the term of this patent is extended or adjusted under 35 U.S.C. 154(b) by 0 days.

(21) Appl. No.: 09/209,343

(22) Filed: Dec. 11, 1998

(30) Foreign Application Priority Data

Dec. 6, 1997 (DE) .............................. 197 54 221

(51) Int. Cl.$^7$ .......................... C22C 13/00; C23C 28/02; F16C 33/12
(52) U.S. Cl. ..................... 428/646; 428/648; 428/652; 428/640; 384/912
(58) Field of Search ................... 426/646, 648, 426/652, 640; 384/912

(56) References Cited

U.S. PATENT DOCUMENTS

| | | | |
|---|---|---|---|
| 4,795,682 | * | 1/1989 | Turner et al. . |
| 4,935,056 | * | 6/1990 | Miyasaka . |
| 5,093,207 | * | 3/1992 | Hodes et al. . |
| 5,116,692 | * | 5/1992 | Mori et al. . |
| 5,766,776 | * | 6/1998 | Buresch . |
| 5,803,614 | * | 9/1998 | Tsuji et al. . |
| 5,925,471 | * | 7/1999 | Eastham et al. . |

FOREIGN PATENT DOCUMENTS

| | | |
|---|---|---|
| 70 35 531 | 3/1941 | (DE) . |
| 44 43 461 C1 | 7/1996 | (DE) . |
| 2 192 642 * | 1/1988 | (GB) . |

* cited by examiner

*Primary Examiner*—Deborah Jones
*Assistant Examiner*—Jason Savage
(74) *Attorney, Agent, or Firm*—Reising, Ethington, Barnes, Kisselle, Learman & McCulloch, P.C.

(57) ABSTRACT

A composite material for plain bearings comprises a backing layer, a bearing metal layer consisting of a copper alloy with a copper content of from 50 to 95 wt. % or an aluminum alloy with an aluminum content of from 60 to 95 wt. %, a diffusion barrier layer and an overlay, applied by electroplating, consisting of a lead-free, tin and copper-containing alloy. The invention provides a composite multilayer material whose overlay, applied by electroplating, does not exhibit any embrittlement even at relatively high temperatures, irrespective of the copper content. The overlay preferably comprises from 8 to 30 wt. % copper, 60 to 97 wt. % tin and 0.5–19 wt. % cobalt.

12 Claims, No Drawings

COMPOSITE MULTILAYER BEARING MATERIAL

BACKGROUND OF THE INVENTION

1. Field of the Invention

The invention relates to a composite multilayer material for plain bearings, comprising a backing layer, a bearing metal layer consisting of a copper alloy with a copper content of from 50 to 95 wt. % or an aluminium alloy with an aluminium content of from 60 to 95 wt. %, a diffusion barrier layer and an overlay, applied by electroplating, consisting of a lead-free, tin- and copper-containing alloy.

2. Description of Related Art

Composite multilayer materials with a structure comprising steel backing/lead-bronze/lead-tin-copper overlay have proven very reliable and to have a high mechanical load carrying capacity. Such composite multilayer materials are described in *Glyco Ingenieurberichte* 1/91, for example.

A typical representative of these groups of materials has the following structure:

steel

CuPb22Sn bearing metal nickel barrier

PbSn10Cu2 overlay.

The electrodeposited overlay in particular is a multifunctional material, which, inter alia, takes on the following tasks:

embeddability with respect to foreign particles running-in or conformability of sliding counterparts corrosion protection for the lead-bronze emergency running properties in the case of an oil shortage.

The bearing metal likewise contains certain emergency running reserves in case the overlay is completely worn away.

These bearing designs, which have proven effective for decades, today however still contain quantities of lead in the bearing metal and the overlay.

Electrodeposition of the ternary overlay has hitherto mainly been carried out using baths containing fluoroborate. Copper deposition could be carried out only up to a rate of 2 wt. % in these baths, while in cyanide baths deposition rates for the copper of up to 20 wt. % could be achieved. However, it has become clear that the coating is extremely brittle and in this respect is not very durable.

DE-OS 27 22 144 discloses the use, as a soft metal bearing alloy for multilayer plain bearings, of an alloy comprising more than 6 to 10 wt. % copper and 10 to 20 wt. % tin, the rest being lead. This alloy may, inter alia, be applied by electrodeposition, wherein a nickel intermediate layer is provided as a diffusion barrier. However, this known alloy, which is produced using conventional electrolyte baths, exhibits coarse tin distribution.

DE 195 45 427.8 describes fluoroborate-free electroplating baths for the production of overlays of lead-tin-copper, said baths containing a grain-refining agent comprising carboxylic acid and a fatty acid glycol ester. In this way, finely crystalline deposition of the tin is achieved with completely homogeneous distribution thereof, copper deposition of from 2 to 16 wt. % being obtained.

The prior German Application DE 196 22 166 describes ternary layers with hard particles, wherein fluoroborate-free electroplating baths with added alkylsulphonic acid are used for the overlay, to obtain a completely homogeneous distribution of the hard particles in the matrix material. In addition to lead-containing overlays, these alkylsulphonic acid baths may also be used for the application of lead-free layers of SnCuNi, Sn, SnCu and CuSn. However, it has been shown that, although copper contents of up to 16% may be obtained with these lead-free layers, these layers do not exhibit satisfactory properties as far as mechanical load carrying capacity and fatigue strength are concerned.

Investigations using fluoroborate-free baths have shown that it is possible for the overlay to contain up to 30 wt. % copper. Deposition proceeds stably and reliably. Another advantage lies in the fact that no copper is deposited on the steel backing of the bearing.

The hardness of the binary alloy SnCu containing 30 wt. % copper, the rest being tin, is ≧100 HV. Extended aging at elevated temperature (170° C.-2000 h) indicated a tendency for the overlay elements to diffuse towards the nickel diffusion barrier layer. This may lead to embrittlement and thus to an impairment of the overlay/diffusion barrier layer or bearing metal/diffusion barrier layer bond.

The advantage of the relatively high overlay hardness achievable through the copper content could not therefore hitherto be fully exploited.

SUMMARY OF THE INVENTION

The object of the invention is therefore to provide a composite multilayer material, whose overlay, applied by electroplating, does not exhibit any embrittlement even at relatively high temperatures, irrespective of the copper content.

This object is achieved in that the overlay comprises from 8–30 wt. % copper, 60–97 wt. % tin and 0.5–19 wt. % cobalt.

It has surprisingly emerged that, by adding cobalt to the alloy, the overlay or the layer structure may altogether be stabilised, without the overlay exhibiting any decrease in hardness. At the same time, cobalt increases the mechanical load carrying capacity (wear resistance and fatigue strength) of the overlay by forming an alloy with tin and copper or aluminium and copper. In addition, thermal stability is increased. Cobalt contents of up to 10 wt. % have proven sufficient to achieve these advantageous effects.

A relatively high tin content is preferably accompanied by a relatively high cobalt content, because it has been found that tin movement may advantageously be reduced by the cobalt content owing to possible crystal formation, so holding embrittlement in check. This association is clear from the exemplary overlay compositions listed in Table 1 below.

TABLE 1

| Copper wt. % | Tin wt. % | Cobalt wt. % |
| --- | --- | --- |
| 30 | 69.5 | 0.5 |
| 25 | 73 | 2 |
| 20 | 76 | 4 |
| 15 | 79 | 6 |
| 10 | 82 | 8 |
| 8 | 82 | 10 |

The overlay may additionally contain bismuth and/or silver and/or nickel in a proportion of up to a maximum of 20 wt. %. The overlay may also comprise hard particles, which may be of $Al_2O_3$, $Si_3N_4$, diamond, $TiO_2$ or SiC. These hard particles may be contained in the overlay either alone or on combination. The diffusion barrier lay may consist of nickel-tin, copper-nickel, cobalt or cobalt-nickel.

DETAILED DESCRIPTION OF THE PREFERRED EMBODIMENT

The diffusion barrier layer preferably comprises a 1 to 3 μm thick nickel layer and a 2 to 10 μm thick nickel-tin layer deposited thereon. In another variant, the diffusion barrier layer consists of cobalt, which may likewise comprise a thickness of from 1 to 3 μm. In the case of a cobalt-nickel layer, thicknesses of from 1 to 3 μm are also preferred.

The cobalt-containing overlay may be applied by electroplating to bearing metal layers of copper-aluminium, copper-tin, copper-lead, copper-zinc, copper-zinc-silicon, copper-zinc-aluminium or copper-aluminium-iron or aluminium-tin, aluminium-tin-silicon or aluminium-zinc. Preferred alloy compositions for the bearing metal layer are as follows:

CuPb22Sn, CuAl8, CuSn6, AlSn6CuNi, AlSn20Cu, AlSn10Ni2MnCu, AlSn15Si3Cu.

The bearing metal layer is preferably also lead-free, such that a composite multilayer material for plain bearings is produced which is altogether lead-free.

The thickness of the overlay is advantageously from 8 to 12 μm.

Table 2 below gives the hardness values of various composite multilayer materials having bearing metals and overlays exhibiting different alloy compositions.

TABLE 2

| No. | Bearing metal | Diffusion barrier layer | Overlay | Hardness HV 1/5/30 |
| --- | --- | --- | --- | --- |
| 1 | CuPb22Sn | Ni/SnNi | SnCu12 | 80 |
| 2 | CuPb22Sn | Co | SnCu26 | 150 |
| 3 | CuPb22Sn | Ni/SnNi | SnCu12Co3 | 90 |
| 4 | CuAl8 | CuNi | SnCu12Co8 | 100 |
| 5 | CuAl8 | Ni/SnNi | SnCu12Co8 | 100 |
| 6 | AlSn20Cu | Ni/SnNi | SnCu12Co3 | 90 |
| 7 | CuPb22Sn | Co | SnCu26Co2 | 150 |

In the first Example, the overlay consists of tin-copper with a copper content of 12 wt. %. The overlay is applied by electroplating to a diffusion barrier layer consisting of a nickel and a tin-nickel layer. In this Example, the bearing metal is CuPb22Sn. The hardness of the overlay is 80 HV.

Example 2 differs from Example 1 in that the copper content is 26 wt. %. Although a hardness of 150 HV is obtained, it has been shown that this overlay does not exhibit the necessary stability at elevated temperatures and becomes brittle, although the cobalt barrier layer does bring about a marked improvement. It proved possible to show that, through the addition of cobalt in Example 3, the hardness increased slightly to 90 HV, the layer then being more stable than that of Example 1.

Examples 3, 4, 5 and 6 relate to embodiments with different diffusion barrier layers and different bearing metals. Example 7 shows that even the small addition of 2 wt. % cobalt may make stable the otherwise unstable SnCu26 alloy, the hardness being maintained at 150 HV.

Obviously, many modifications and variations of the present invention are possible in light of the above teachings. It is, therefore, to be understood that within the scope of the appended claims, the invention may be practiced otherwise than as specifically described.

What is claimed is:

1. A composite multilayer plain bearing comprising:

a backing layer;

a bearing layer applied to a surface of said backing layer;

a lead-free diffusion barrier layer applied to said bearing metal layer; and a lead-free overlay applied to said barrier layer consisting essentially of 8–30 wt % copper, 60–97 wt % tin, and 0.5 to 10 wt % cobalt.

2. The composite multilayer bearing of claim 1 wherein said bearing metal layer comprises a copper alloy having a copper content ranging from 50–95 wt %.

3. The composite multilayer bearing of claim 1 wherein said bearing metal layer comprises an aluminum alloy having an aluminum content ranging from 60–95 wt %.

4. The composite multilayer bearing of claim 1 wherein said lead-free overlay includes at least one additional alloy constituent selected from the group consisting essentially of: bismuth, silver and nickel in a proportion of up to 20 wt %.

5. The composite multilayer bearing of claim 1 wherein said lead-free overlay includes at least one hard particle addition selected from the group consisting essentially of: $Al_2O_3$, $Si_3N_4$, diamond, $TiO_2$ and Sic.

6. The composite multilayer bearing of claim 1 wherein said diffusion barrier layer consists essentially of nickel.

7. The composite multilayer bearing of claim 1 wherein said diffusion barrier layer consists essentially of a nickel layer having a thickness of about 1 to 3 mm and a nickel-tin deposited on said nickel layer having a thickness of about 2 to 10 mm.

8. The composite multilayer bearing of claim 1 wherein said diffusion barrier layer consists essentially of a copper-nickel alloy.

9. The composite multilayer bearing of claim 1 wherein said diffusion barrier layer consists essentially of a cobalt layer having a thickness of about 1 to 3 mm.

10. The composite multilayer bearing of claim 1 wherein said diffusion barrier layer consists essentially of a cobalt-nickel layer having a thickness of about 1 –3 mm.

11. The composite multilayer bearing of claim 1 wherein said bearing metal layer is selected from an alloy consisting of: copper-aluminum, copper-tin, copper-lead, copper-zinc-aluminum, copper-aluminum-iron, aluminum-tin, aluminum-tin-silicon, or aluminum-zinc.

12. The composite multilayer bearing of claim 1 wherein said alloys of said bearing metal layer exclude said copper-lead and other lead-containing alloys.

* * * * *

UNITED STATES PATENT AND TRADEMARK OFFICE
CERTIFICATE OF CORRECTION

PATENT NO.   : 6,194,087 B1
DATED        : February 27, 2001
INVENTOR(S)  : Hans-Ulrich Huhn et al.

It is certified that error appears in the above-identified patent and that said Letters Patent is hereby corrected as shown below:

Title page,
Item [73], Assignee, change "Clyco" to -- Glyco --.

Column 2,
Between lines 35 and 36, insert the following centered heading -- DETAILED DESCRIPTION OF THE PREFERRED EMBODIMENT --.

Replace the paragraph beginning at column 3, line 1, with the following rewritten paragraph:
-- or in combination. The diffusion barrier lay may consist of nickel, nickel-tin, copper-nickel, cobalt or cobalt-nickel. --; delete lines 3 and 4 in their entirety.

Claim 5,
Rewrite as follows:
5. The composite multilayer bearing of claim 1 wherein said lead-free overlay includes at least one hard particle addition selected from the group consisting essentially of:
$Al_2O_3$, $Si_3N_4$, diamond, $TiO_2$ and SiC.

UNITED STATES PATENT AND TRADEMARK OFFICE
CERTIFICATE OF CORRECTION

PATENT NO. : 6,194,087 B1
DATED : February 27, 2001
INVENTOR(S) : Hans-Ulrich Huhn et al.

It is certified that error appears in the above-identified patent and that said Letters Patent is hereby corrected as shown below:

Claim 7,
Rewrite as follows:
7. The composite multilayer bearing of claim 1 wherein said diffusion barrier layer consists essentially of a nickel layer as having thickness of about 1 to 3 mm and a nickel-tin layer deposited on said nickel layer having a thickness of about 2 to 10 mm.

Signed and Sealed this

Eighteenth Day of December, 2001

Attest:

*Nicholas P. Godici*

NICHOLAS P. GODICI
*Attesting Officer*    *Acting Director of the United States Patent and Trademark Office*